United States Patent
Chan et al.

(10) Patent No.: US 7,975,982 B2
(45) Date of Patent: Jul. 12, 2011

(54) ELECTROMAGNETIC VALVE

(75) Inventors: Chi Wai Chan, Tsuen Wan (CN); Keung Chau, Quarry Bay (CN)

(73) Assignee: Defond Components Limited, Hong Kong SAR (CN)

( * ) Notice: Subject to any disclaimer, the term of this patent is extended or adjusted under 35 U.S.C. 154(b) by 412 days.

(21) Appl. No.: 12/203,206

(22) Filed: Sep. 3, 2008

(65) Prior Publication Data
US 2010/0051844 A1    Mar. 4, 2010

(51) Int. Cl.
*F16K 31/02*    (2006.01)

(52) U.S. Cl. ............. 251/129.15; 335/281; 335/297

(58) Field of Classification Search ............. 251/129.15; 335/281, 297
See application file for complete search history.

(56) References Cited

U.S. PATENT DOCUMENTS

| | | | | |
|---|---|---|---|---|
| 4,423,841 A * | 1/1984 | Palma | | 239/585.4 |
| 5,364,067 A * | 11/1994 | Linkner, Jr. | | 303/119.2 |
| 5,681,097 A * | 10/1997 | Tackett et al. | | 303/119.2 |
| 6,405,752 B1 * | 6/2002 | Fritsch et al. | | 137/550 |
| 6,529,106 B1 * | 3/2003 | Linhoff et al. | | 251/129.15 |
| 6,778,051 B2 * | 8/2004 | Shirase et al. | | 335/278 |
| 2005/0211938 A1 * | 9/2005 | Ryuen et al. | | 251/129.15 |
| 2007/0158604 A1 * | 7/2007 | Kondo et al. | | 251/129.15 |
| 2007/0171583 A1 * | 7/2007 | Talon et al. | | 361/23 |
| 2008/0203343 A1 * | 8/2008 | Kratzer | | 251/129.15 |

* cited by examiner

*Primary Examiner* — John Bastianelli
(74) *Attorney, Agent, or Firm* — Leydig, Voit & Mayer, Ltd.

(57) ABSTRACT

In an electromagnetic valve, a stator assembly includes an electrically energizable coil and a thin-walled core which receives and reciprocally supports an armature. The thin-walled core has a closed end and an open end, the open end being in fluid communication with a fluid flow passage within a valve member. The valve member reciprocates with the armature to control flow rate in the flow passage. A flange integral with the thin-walled core extends about the open end. A washer receives the thin-walled core and abuts the flange. The flange and the washer are received in a recess in the valve body and are permanently and sealingly fixed therein by a swaged joint in the valve body.

8 Claims, 3 Drawing Sheets

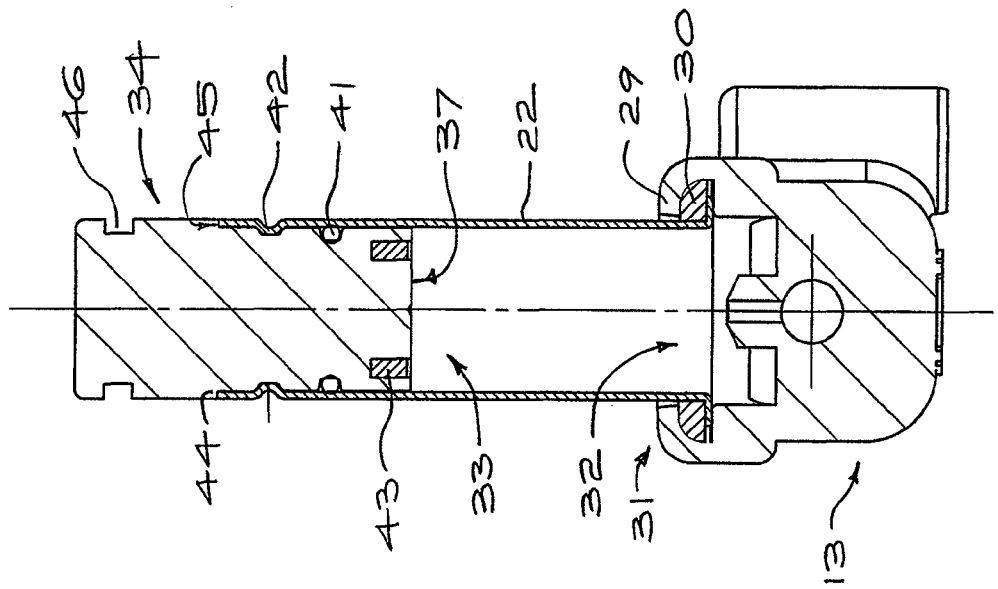
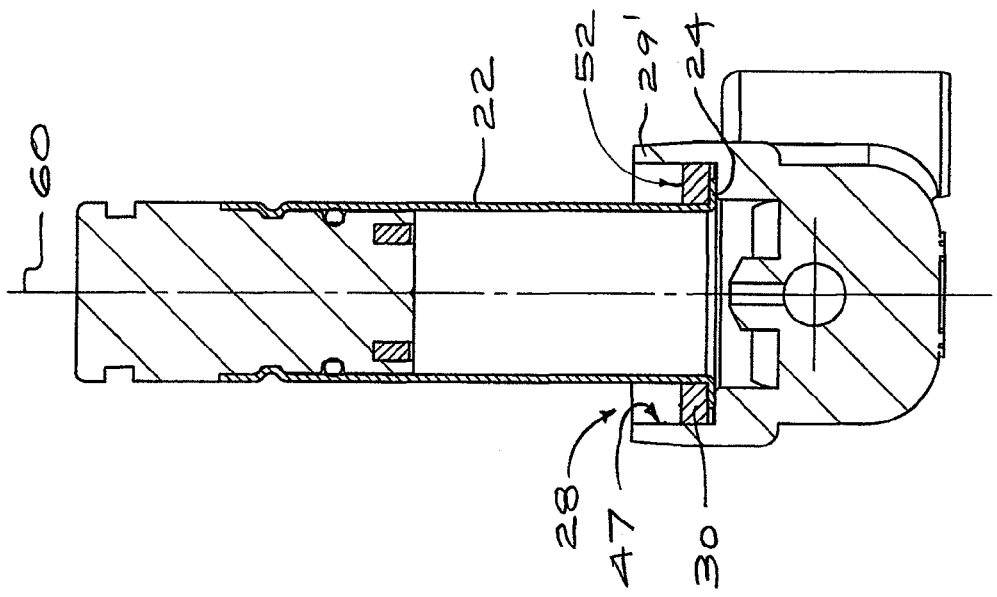

ELECTROMAGNETIC VALVE

TECHNICAL FIELD

The present invention relates to an electromagnetic valve apparatus that generates a magnetic attractive force between a stationary field coil and an armature for controlling a flow rate in a flow passage by means of a valve member which is displaced by the armature.

BACKGROUND OF THE INVENTION

Generally, it is known that an electromagnetic valve has a field coil fixed within a housing portion and an internal armature that can reciprocate, being attracted by the field coil in one of the reciprocating directions. A valve body is mounted to the housing portion and defines a flow passage, with a valve member mounted to the armature for cooperating with the valve body to control flow through the flow passage.

In valves of this type the mechanical connection between the housing portion and valve body should avoid the possibility that the axes of the housing and valve body portions may deviate from each other due to assembly errors or other reasons and should provide a fluid tight seal. Moreover, in designs where the armature is exposed to fluid pressure, a separating wall is required about the armature to contain the fluid from entering the field coil. In such valves there is therefore a need for this separating wall to be thin so as to mitigate any loss of magnetic attractive force. It is an object of the present invention to address the above needs or more generally to provide an improved electromagnetic valve.

SUMMARY OF THE INVENTION

According to one aspect of the present invention, there is provided an electromagnetic valve comprising:
- a stator assembly including an electrically energizable coil;
- an armature cooperating with the stator assembly to define a magnetic circuit upon energization of the coil;
- wherein the stator assembly includes a thin-walled core which receives and reciprocally supports the armature, the thin-walled core having a closed end and an open end;
- an annular flange integral with the thin-walled core and extending about the open end;
- a valve body defining a flow passage between ports in the valve body;
- a recess in the valve body in which the flange is received, such that the open end is in communication with the flow passage;
- a washer receiving the thin-walled core therethrough and abutting the flange;
- a swaged joint in the valve body sealingly fixing the flange and washer in the recess; and
- a valve member mounted to the armature such that the valve member reciprocates with the armature to control a flow rate in the flow passage.

Preferably, the washer and valve body are made of materials that are relatively softer than the material of the thin-walled core.

Preferably, the thin-walled core is cylindrical and the closed end is closed by a plug member having an inner portion and an outer portion. The inner portion is received in the thin-walled core. The inner portion has an inner face defining the closed end and a peripheral face complementary to the thin-walled core, with first and second annular recesses formed in the peripheral face. A sealing ring is received in the first annular recess, and a protrusion from the thin-walled core extends into the second annular recess for fixing the plug member in the thin-walled core.

Preferably, the valve body defines a valve seat extending about a restricted portion of the flow passage. The valve member includes a compliant seal for engaging the valve seat. The valve further includes a compression spring having one end abutting the inner face for urging the seal to engage the valve seat.

It is preferred that the washer has an edge about which the swaged joint is formed, the edge being pressed round during formation of the swaged joint.

In another aspect, the invention provides an electromagnetic valve comprising:
- a stator assembly including an electrically energizable coil encapsulated in a prismatic polymeric body;
- an elongate aperture extending through the body and the coil;
- an armature cooperating with the stator assembly to define a magnetic circuit upon energization of the coil;
- wherein the stator assembly further includes a thin-walled core which receives and reciprocally supports the armature, the thin-walled core received in the elongate aperture and having longitudinally opposing first and second ends, the first end being disposed within the body and the second end disposed outside the body;
- a plug member received in and closing the first end, the plug member having an inner face,
- an annular flange integral with the thin-walled core and extending about second end;
- a valve body defining a flow passage between ports in the valve body and a valve seat extending about a restricted portion of the flow passage;
- a recess in the valve body in which the flange is received, such that the second end is in communication with the flow passage;
- a washer receiving the thin-walled core therethrough and abutting the flange;
- a swaged joint in the valve body sealingly fixing the flange and washer in the recess;
- a compliant valve member mounted to the armature; and
- a compression spring having opposing ends abutting the inner face and valve member for urging the valve member to engage the valve seat such that the valve member reciprocates with the armature to control a flow rate in the flow passage.

This invention provides an electromagnetic valve which is effective and efficient in operational use, and which by its overall simple design minimizes manufacturing costs. It allows a thin-walled core to be used which requires a minimum of material.

BRIEF DESCRIPTION OF THE DRAWINGS

Preferred forms of the present invention will now be described by way of example with reference to the accompanying drawings, in which:

FIG. 3a is a schematic cross section illustrating the assembly of the core and valve body of the valve of FIG. 1 before the formation of a swaged joint, and FIG. 3b is a schematic cross section showing the assembly of FIG. 3b after the formation of a swaged joint.

DESCRIPTION OF THE PREFERRED EMBODIMENTS

Figure 1:
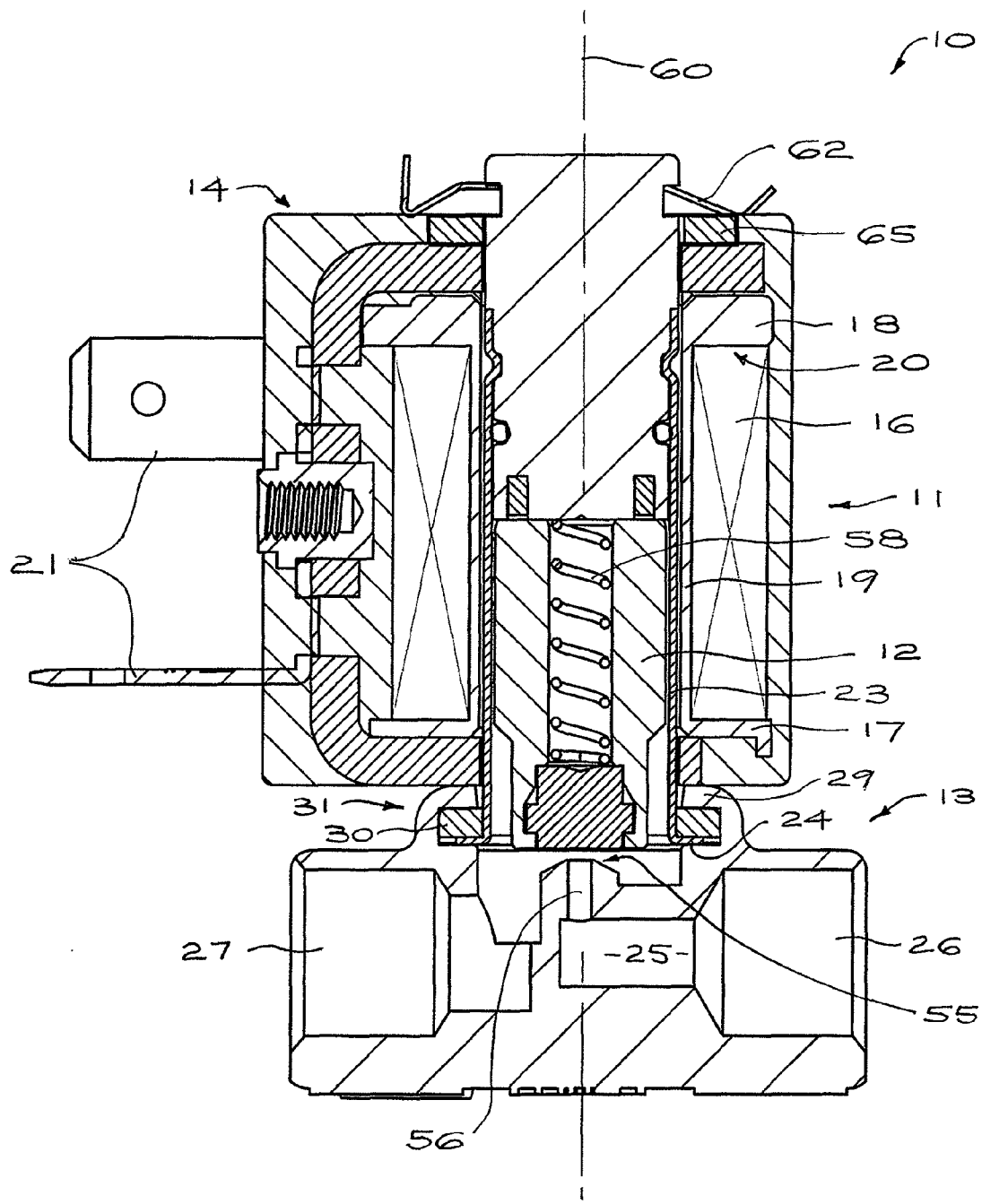
FIG. 1 is a sectional view of an electromagnetic valve according to a preferred embodiment of the invention.
Figure 2:
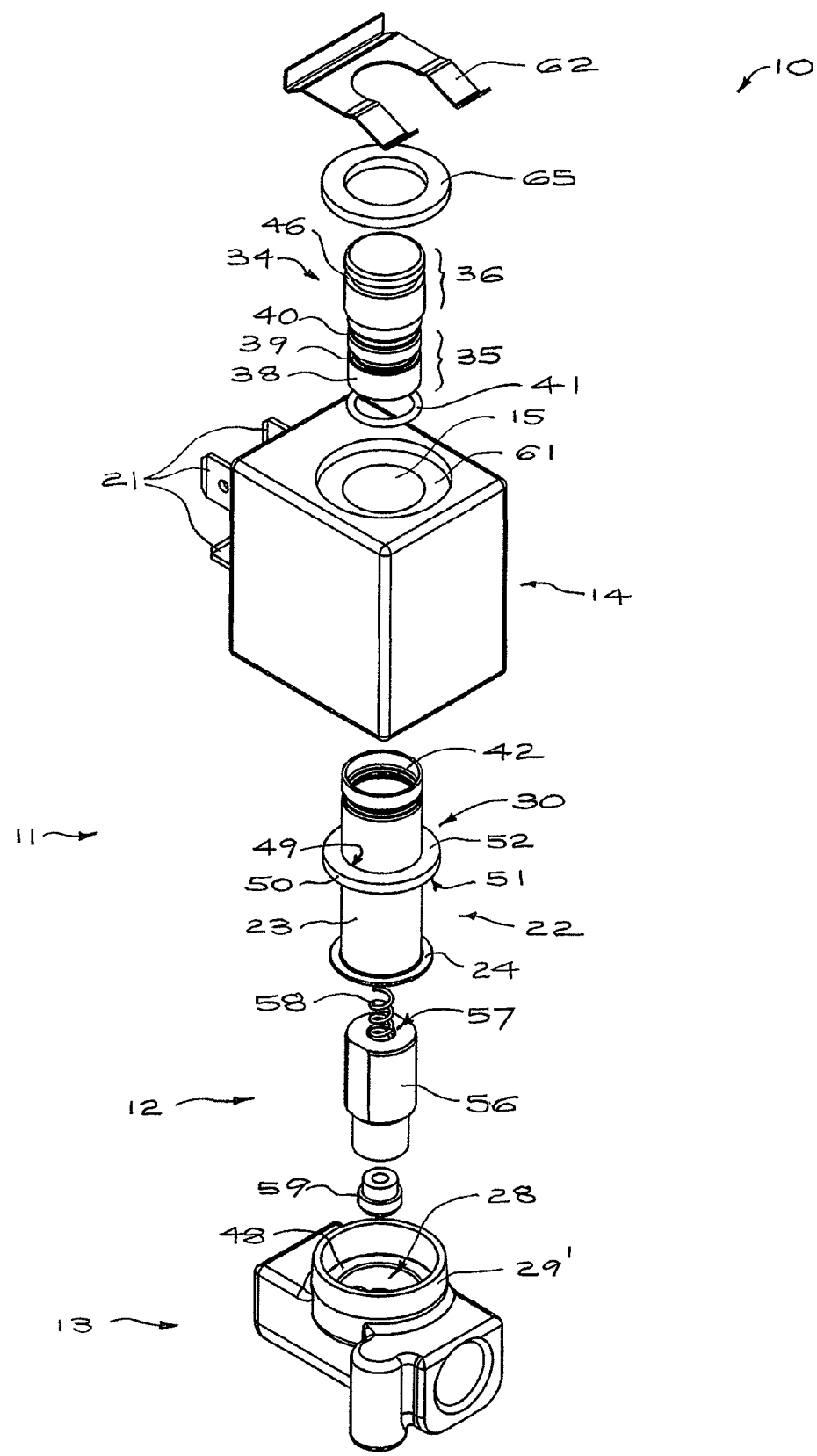
FIG. 2 is an exploded pictorial view of the valve of FIG. 1.

Referring to FIGS. 1 and 2, an electromagnetic valve 10 generally includes a stator assembly 11, an armature 12 and a valve body 13. The stator assembly 11 includes a polymeric body 14 of a rectangular prismatic form with an opening 15 with a circular section that extends therethrough. The body 14 is moulded polymer and encapsulates a field coil 16 wound on a bobbin 20. The bobbin 20 includes a thin cylindrical wall 19 generally aligned with the opening 15 with annular lips 17, 18 at axially opposing ends of the wall 19. The coil 16 is thus bounded between the cylindrical wall 19, lips 17, 18 and the body 14. Electrical contacts 21 project from the body 14 and are electrically coupled to the coil 16.

As used herein, the term "axial" refers to a direction substantially parallel to the axis 60. The term "radial" refers to a direction substantially orthogonal to the axis 60. The term "circumferential" refers to the direction of a circular arc having a radius substantially orthogonal to the axis 60.

The stator 11 is an assembly that further includes a core 22 formed as by deep drawing from stainless steel. The core 22 includes a thin-walled tubular portion 23 with an integral annular flange 24 formed at a first, open end 32 thereof and protruding orthogonally to the tubular portion 23. The flanged core 22 may be of stainless steel, brass or any other suitable non-magnetic metal materials, usually made by a drawing process and then cutting out as an integral piece.

The valve body 13 is formed from brass and defines a flow passage 25 between inlet and outlet ports 26, 27 having internal screw threads (not shown). The valve body 13 defines a valve seat 55 extending about a restricted portion 56 of the flow passage 25

A recess 28 in one side of the valve body 13 opens into the flow passage 25 and is bounded by a lip 29. The core 22 is received in a washer 30. The washer 30 is preferably metallic and of a material which is softer than the material of the core 22, such as annealed aluminium. The washer 30 abuts the flange 24. A swaged joint 31 formed by deformation of the lip 29 (from its original form indicated by 29' in FIGS. 2 and 3a) fixes the flange 24 and washer 30 in the recess 29. In this manner the open end 32 of the core 22 is fixed in communication with the flow passage 25, while aligned with the valve seat 55.

Opposing the open end 32 the core has a closed end 33 closed by a plug member 34 having an inner portion 35 and an outer portion 36. The inner portion 35 is received in the core 22 and has a flat inner face 37 which extends radially to define the closed end 33. A peripheral face 38 is complementary to the core 22 and includes first and second annular recesses 39, 40 therein. A sealing ring 41 is received in the first annular recess 39 and an inwardly protruding annular rib 42 is received in the second annular recess 40 for fixing the plug member 34 in the thin-walled core 22. A shading ring 43 is embedded into the face 37. The outer end 36 includes a shoulder 44 for abutting the end face 45 of the core 22 and a circumferential groove 46.

FIGS. 3a and 3b illustrate the manner in which the core 22 and valve body 13 are permanently joined by the swaged joint 31 (note that the armature 12 enclosed therein has been omitted from these two drawings for clarity). The valve body 13 is manufactured such that an annular, radially-aligned face 48 extends in and about the recess 28. The lip 29 extends axially and has a cylindrical, axially aligned inner face 47. The washer 30 has inner and outer cylindrical faces 49 and 50 which match with, and are a snug fit with, adjacent cylindrical outer face of the core 22 and cylindrical face 47 of the recess 28 respectively. This arrangement, and in particular the snug fit, allows the core end 32 and washer 30 thereon to enter the recess 28 in a guided manner and then holds the core 22 in axial alignment with and stable location about the recess 28, thereby facilitating subsequent manufacturing process including in particular the forming of the swaged joint 31.

Opposing principal faces 51, 52 of the washer are flat and co-parallel, with the inner face 51 abutting the core flange 24, which in turn abuts the annular face 48 in the recess 28. In a swaging operation, a press tool (not shown) plastically deforms the lip 29 to engage the outer washer face 52 thereby forming a tight swaged joint 31. Upon closing in on the washer 30, the lip 29 presses against and thus squashes and deforms the washer 30 especially about its upper rim between the outer faces 50 and 52 (see FIG. 3b), thereby ensuring a fluid-tight joint between the lip 29 and the washer 30 with the core 22. The upper rim was originally a right-angled edge and is now pressed round. The material of the washer 30 is preferably slightly softer than that of the lip 29 for deformation.

The valve body 13 and core sub-assembly of FIG. 3b (including the armature 12) is assembled to the body 14 by inserting the core 22 from below into the opening 15. A washer 65 is received in a top recess 61 in the body 14, and they are retained on the core 22 by a spring clip 62 which engages the groove 46 at the exposed end of the plug member 34.

The armature 12 has a cylindrical surface 56 complementary to the inner surface of the core 22 and an axially extending recess 57. The armature 12 may be made from a ferromagnetic material. Held within the armature 12 is a valve member in the form of a compliant seal 59 for engaging the valve seat 55. The valve further includes a compression spring 58 received in the recess 57 having one end abutting the inner face 37 and another end abutting the seal 59 for urging it to engage the valve seat 55. In this manner the seal 59 is mounted to the armature 12 such that the seal 59 reciprocates with the armature 12 to control the flow rate in the flow passage 25. When the coil 16 is energized the armature 12 is attracted by the coil 16, thereby separating the seal 59 from the valve seat 55 to open the valve (as shown in FIG. 1).

Aspects of the present invention have been described by way of example only and it should be appreciated that modifications and additions may be made thereto without departing from the scope thereof.

The invention claimed is:
1. An electromagnetic valve comprising:
a stator assembly including an electrically energizable coil;
an armature cooperating with the stator assembly to define a magnetic circuit upon energization of the coil, wherein
the stator assembly includes a cylindrical thin-walled core which receives and reciprocally supports the armature, and
the thin-walled core has a closed end and an open end, and an integral annular flange extending around the open end;
a plug member closing the closed end of the thin-walled core, wherein
the plug member has an inner portion and an outer portion,
the inner portion is received in the thin-walled core, and
the inner portion includes an inner face defining the closed end, and a peripheral face, complementary to the thin-walled core, the peripheral face including first and second annular recesses;

a sealing ring received in the first annular recess, wherein a protrusion from the thin-walled core extends into the second annular recess and fixes the plug member in the thin-walled core;

a valve body defining a flow passage between ports in the valve body;

a recess in the valve body in which the annular flange of the thin-walled core is received, with the open end in communication with the flow passage;

a washer, through which the thin-walled core passes, abutting the annular flange of the thin-walled core, wherein the washer has inner and outer cylindrical faces that match with respective adjacent cylindrical faces of the thin-walled core and the recess in a snug fit which holds the thin-walled core in axial alignment with the recess;

a swaged joint in the valve body sealingly fixing the annular flange of the thin-walled core and the washer in the recess; and a valve member mounted on the armature, wherein the valve member reciprocates with the armature to control flow in the flow passage.

2. The electromagnetic valve of claim 1, wherein the washer and the valve body are softer than the the thin-walled core.

3. The electromagnetic valve of claim 1, wherein
the valve body defines a valve seat extending about a restricted portion of the flow passage,
the valve member includes a compliant seal for engaging the valve seat, and
the valve includes a compression spring having an end abutting the inner face and urging the seal to engage the valve seat.

4. The electromagnetic valve of claim 1, wherein the washer has an edge about which the swaged joint is located, the edge is, in the cross section, rounded in the swaged joint.

5. An electromagnetic valve comprising:
a stator assembly including an electrically energizable coil encapsulated in a prismatic polymeric body;
an elongate aperture extending through the body and the coil;
an armature cooperating with the stator assembly to define a magnetic circuit upon energization of the coil, wherein
the stator assembly includes a thin-walled cylindrical core which receives and reciprocally supports the armature, and
the thin-walled core is received in the elongate aperture, and has longitudinally opposing first and second ends, the first end being disposed within the body and the second end being disposed outside the body, and
an integral annular flange extending around the second end;

a plug member received in and closing the first end of the thin-walled core, the plug member having an inner face, a peripheral face, the peripheral face being complementary to the thin-walled core and including first and second annular recesses; and a sealing ring received in the first annular recess, wherein a protrusion from the thin-walled core extends into the second annular recess and fixes the plug member in the thin-walled core:

a valve body defining a flow passage between ports in the valve body and a valve seat extending about a restricted portion of the flow passage;

a recess in the valve body in which the annular flange of the thin-walled core is received, such that the second end of the thin walled core is in communication with the flow passage;

a washer, through which the thin-walled core passes, abutting the flange;

a swaged joint in the valve body sealingly fixing the annular flange of the thin-walled core and the washer in the recess;

a compliant valve member mounted on the armature; and a compression spring having opposing ends abutting the inner face and the valve member, respectively, and urging the valve member to engage the valve seat, wherein the valve member reciprocates with the armature to control flow in the flow passage.

6. The electromagnetic valve of claim 5, wherein the washer and the valve body are softer than the thin-walled core.

7. The electromagnetic valve of claim 5, wherein the washer has inner and outer cylindrical faces that match with respective adjacent cylindrical faces of the core and the recess in a snug fit which holds the core in axial alignment with the recess.

8. The electromagnetic valve of claim 6, wherein the washer has an edge about which the swaged joint is located, the edge is, in cross section, rounded in the swaged joint.

* * * * *